US 8,988,226 B2

(12) United States Patent
Vinano et al.

(10) Patent No.: US 8,988,226 B2
(45) Date of Patent: Mar. 24, 2015

(54) HIGH EFFICACY SIGNAL FORMAT AND THIN-PROFILE ANKLE-MOUNTING FOR ELECTRONIC SHARK DETERRENT

(76) Inventors: Wilson Vinano, Honolulu, HI (US); Clifford Lau, Honolulu, HI (US)

(*) Notice: Subject to any disclaimer, the term of this patent is extended or adjusted under 35 U.S.C. 154(b) by 1030 days.

(21) Appl. No.: 13/074,196

(22) Filed: Mar. 29, 2011

(65) Prior Publication Data
US 2011/0174235 A1 Jul. 21, 2011

Related U.S. Application Data

(63) Continuation-in-part of application No. 12/238,185, filed on Sep. 25, 2008, now Pat. No. 7,924,165.

(51) Int. Cl.
*G08B 23/00* (2006.01)
*A01K 79/02* (2006.01)

(52) U.S. Cl.
CPC .............. *A01K 79/02* (2013.01); *Y10S 119/908* (2013.01)
USPC ..................... 340/573.1; 340/573.4; 340/540; 340/541; 340/635; 340/636.2; 340/539.1; 340/539.13; 119/220; 119/719; 119/852; 119/908

(58) Field of Classification Search
CPC ...................................................... A01K 79/02
USPC ................. 340/573.2, 573.44, 540, 541, 635, 340/636.2, 539.1, 539.13; 119/220, 719, 119/852, 908
See application file for complete search history.

(56) References Cited

U.S. PATENT DOCUMENTS

| 3,164,772 A | 1/1965 | Hicks |
| 3,683,280 A | 8/1972 | Holt |
| 4,211,980 A | 7/1980 | Stowell |
| 5,566,643 A * | 10/1996 | Charter et al. ................. 119/220 |
| 6,606,963 B1 * | 8/2003 | Wynne .......................... 119/220 |
| 2003/0151514 A1 * | 8/2003 | Sargent ....................... 340/573.2 |

* cited by examiner

*Primary Examiner* — Tai T Nguyen
(74) *Attorney, Agent, or Firm* — Dickinson Wright PLLC

(57) ABSTRACT

A device operable as an electronic shark deterrent has a high-voltage pulse signal waveform generator for pulses to be applied to electrodes immersed in water to deter sharks and other aquatic creatures. A preferred output waveform has a train of pulse bursts of alternating-polarity pulses in a series. Preferably, the timing intervals between pulses are of irregular duration, the amplitudes of pulses are varied to be irregular, and the interval between pulse bursts is kept to less than about 5 seconds, in order to be more effective as a shark deterrent signal. The device has the signal waveform generator enclosed in a thin, planar case mounted to a belt connector and a fastener strap for attachment to a part of a user's body. It can include a water-detection probe for automatic activation when immersed in water, a status LED indicator, and electrodes embedded in a layer at opposite ends of the fastener strap with an insulative screen layer for reducing electrostatic effects on the user.

17 Claims, 17 Drawing Sheets

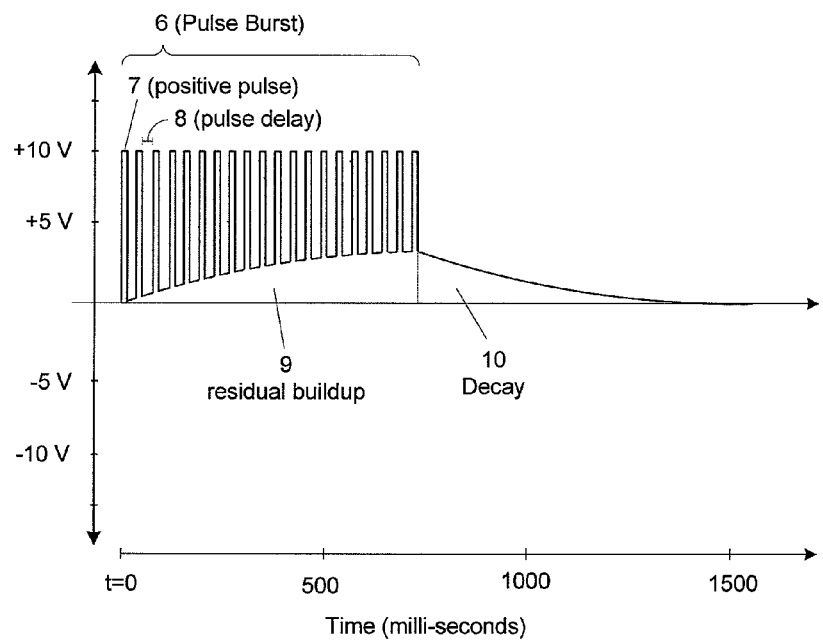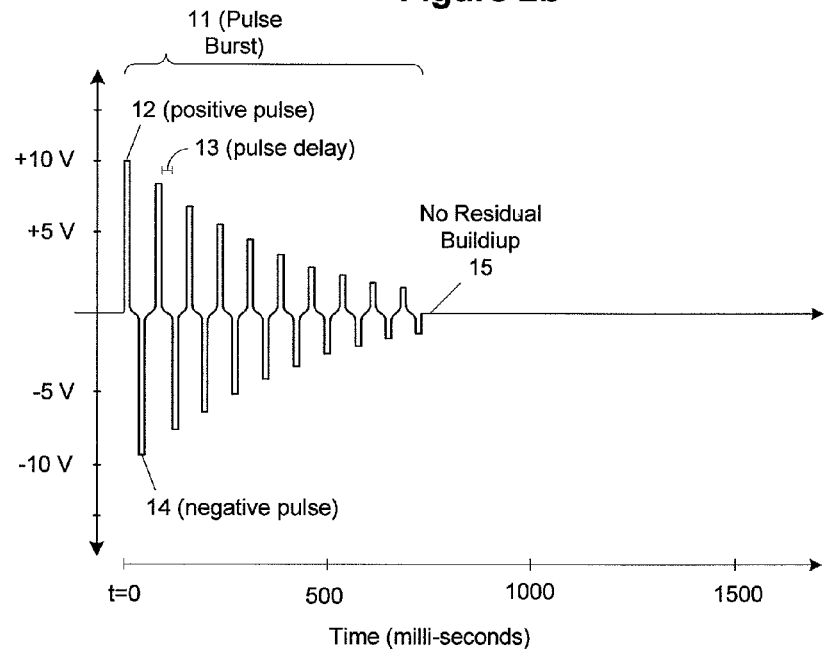

Figure 4

| Exp. No. | Conditions | Results |
|---|---|---|
| 1 | o Known feeding area inhabited by Grey Reef, Galapogos and White Tip Reef sharks. Approximately 30 sharks in area<br>o Cylindrical mesh bag (length = 3 ft., diameter = 2ft.) filled with 25 lbs. of dead and dismembered fish, suspended to depth of 85 feet<br>o Electronic Shark Deterrence device suspended approximately 2 feet from mesh bag | o Approaches by multiple sharks attempting to bite mesh bag were successfully repelled – no shark approached close enough to tear the mesh bag<br>o Single shark attempting to bite Electronic Deterrence Device instantly repelled after apparently receiving electrical shock<br>o Mesh bag never bitten or damaged while Electronic Shark Deterrence device present within approximately 2 feet of mesh bag and activated |
| 2 | o Known feeding area inhabited by Grey Reef, Galapogos and White Tip Reef sharks. Approximately 30 sharks responded to mesh bag<br>o Cylindrical mesh bag (length = 3 ft., diameter = 2ft.) filled with 25 lbs. of dead and dismembered fish, suspended to depth of 95 feet<br>o No Electronic Deterrence Device present | o Within seconds of removal of Electronic Shark Deterrence device from proximity to mesh bag, multiple sharks bite and rip open mesh bag releasing all the bait fish into the surrounding water causing a feeding frenzy involving approximately 30 sharks. |
| 3 | o Known feeding area inhabited by Grey Reef, Galapogos and White Tip Reef sharks. Approximately 30 sharks responded to mesh bag<br>o Fish bait continuously spread around feeding area to entice sharks, attracting up to 30 sharks to the area<br>o Electronic Shark Deterrence device held in test diver's hand<br>o Test diver positioned at depth of 80 feet in area containing disbursed fish bait | o Sharks attempting to approach within 10 feet of diver immediately turned away from diver – even when fish bait in close proximity to diver<br>o Numerous close approaches were attempted by sharks, but at no time was the test diver bitten or harmed by any shark |

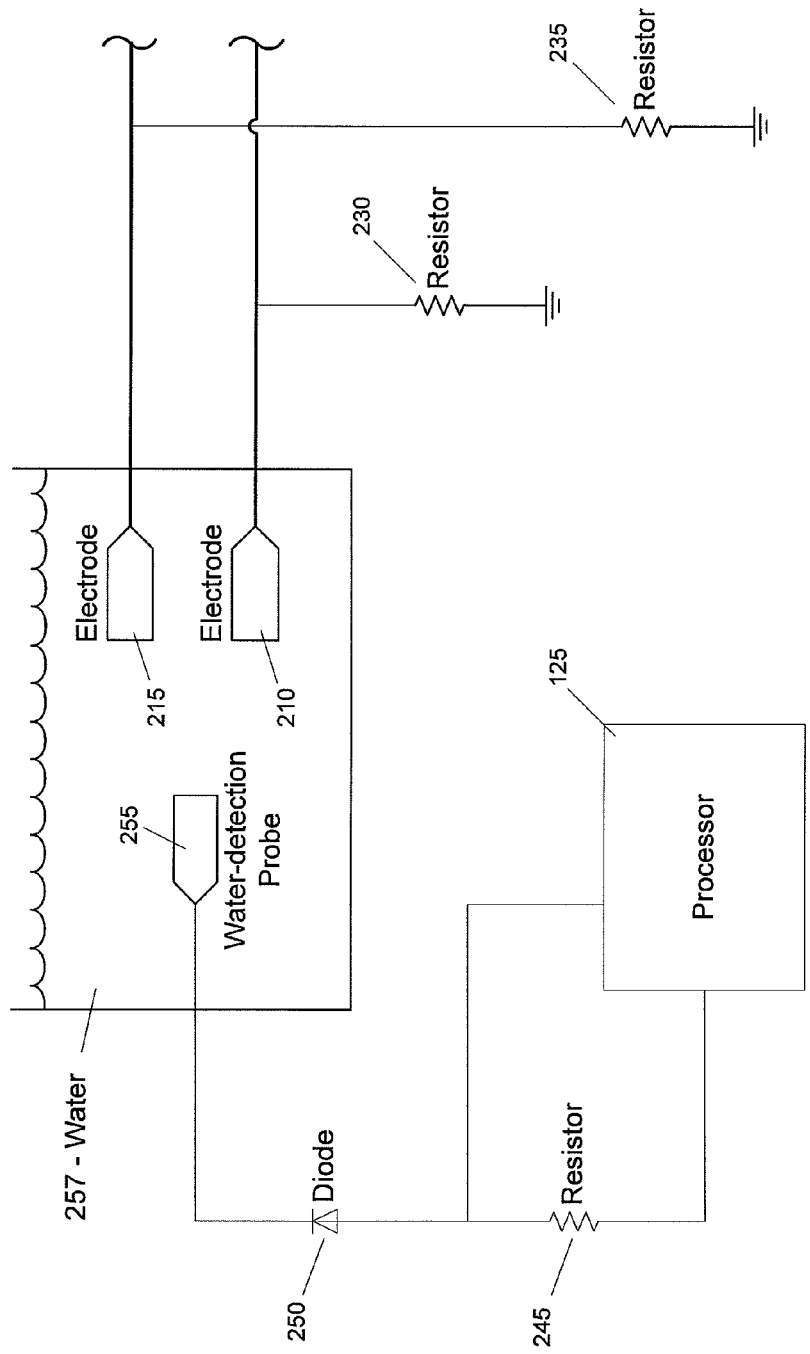

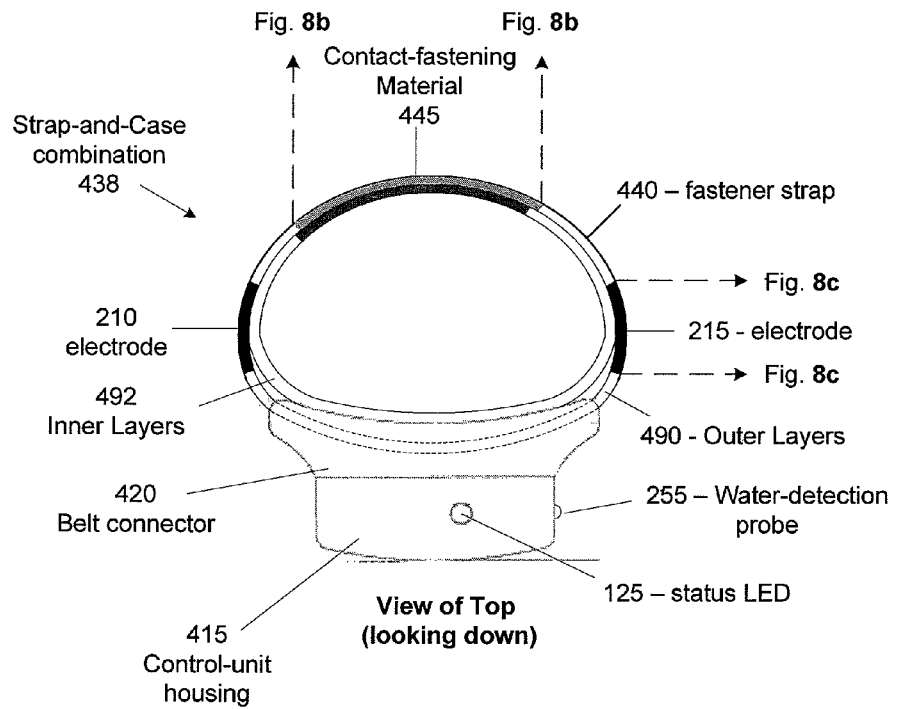
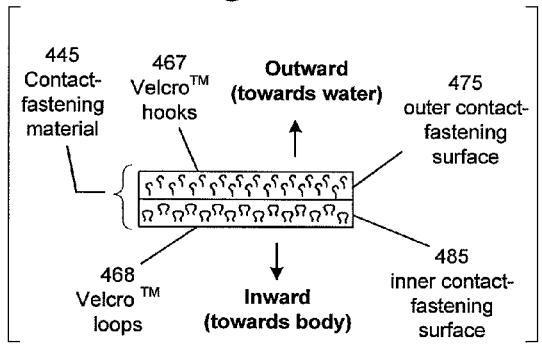
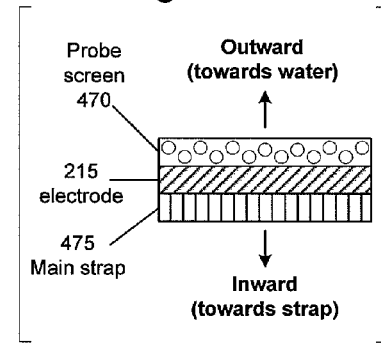

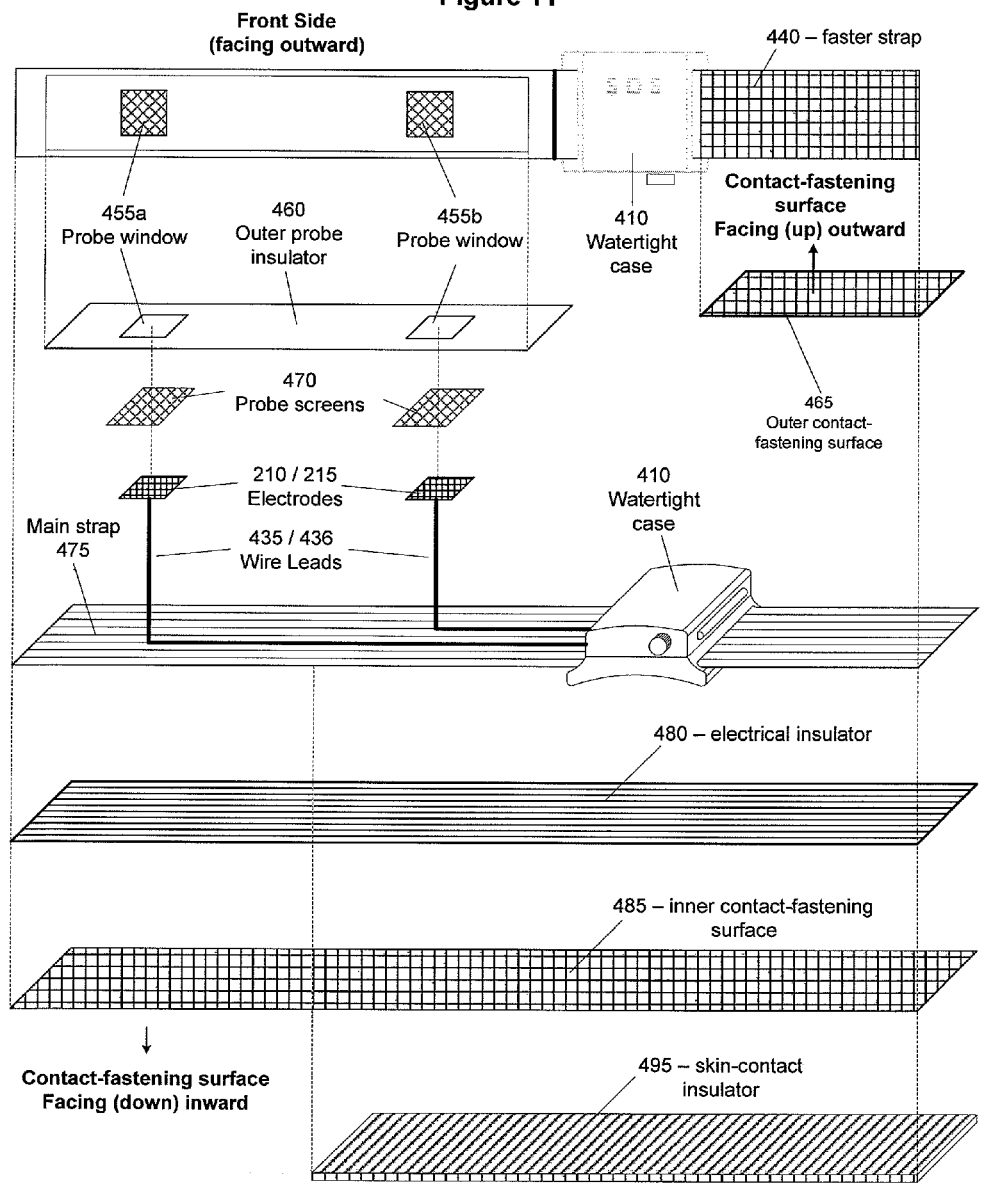

HIGH EFFICACY SIGNAL FORMAT AND THIN-PROFILE ANKLE-MOUNTING FOR ELECTRONIC SHARK DETERRENT

This U.S. Patent Application is a continuation-in-part of prior U.S. patent application Ser. No. 12/238,185, filed Sep. 25, 2008, entitled "Electronic Shark Deterrent", which issued as U.S. Pat. No. 7,924,165 on Apr. 12, 2011.

TECHNICAL FIELD

The presently disclosed invention relates generally to an electronic shark deterrent, and particularly to a method for operation and apparatus having a high efficacy signal format and thin-profile device capable of mounting to the body or other object for use in the sea.

BACKGROUND OF THE INVENTION

There is clearly a need to devise methods for protecting both humans and aquatic predators, such as sharks and other members of the Elasmobranchi subclass, from harmful interactions. Various methods have been used to deter sharks and other aquatic creatures from entering or remaining in aquatic areas used by humans, including chemical, mechanical, sonic or electrical means.

The underlying mechanism of electronic deterrent devices against sharks has been a subject of differing or inconsistent approaches. On one hand, it has been proposed that the current and/or voltage associated with electricity are responsible for the repellent effect of electricity against sharks and related creatures. In Holt U.S. Pat. No. 3,683,280, for example, a pulse-generating circuit is used to produce pulses applied between a pair of widely-spaced electrodes. Holt concluded that the principle of operation was based on producing a voltage drop and current flow within the area of deterrence. Other proposals, on the other hand, have concluded that it is the electric field generated by voltage applied across antennae or electrodes that is responsible for deterring sharks and other creatures. Hicks U.S. Pat. No. 3,164,772), for example, reached this conclusion based upon the observation that sharks can be repelled by electrical discharges in salt water, even though no electrical current was measurable at the effective ranges of 20 to 30 feet and no electric shock occurred to divers or other aquatic creatures. The predominant view today is that sharks and other members of the Elasmobranchi subclass are repelled by the electric field generated by current flowing through water, as opposed to the voltage potential or current itself.

Although the exact mechanism of shark sensitivity to electric fields is not fully understood, it is clear that the use of electricity in seawater offers certain advantages and disadvantages. First, electric fields are theorized to negatively affect the sensory organs in the nervous system of sharks and other Elasmobranchi—particularly sensors located in the shark's nose, as noted in Hicks and Stowell U.S. Pat. No. 4,211,980. These and other references describe how electric fields interfere with the natural timing of the shark's nervous and sensory systems causing irritation or even death. Specifically, pulse patterns of direct current (DC) in the 6-12 count-per-second (cps) range are reported to affect optimal deterrence against sharks. It is also reported that sharks and other Elasmobranchi are relatively insensitive to the direct effects of continuous DC and alternating currents applied to sea water. In contrast, humans and other sea life unrelated to sharks lack this observed sensitivity to electric fields, while exhibiting profound sensitivity to both direct and alternating current. Thus, the use of electric fields to deter sharks and related creatures offers the advantage of selectivity as compared to other physical and chemical methods.

The disadvantage of using electricity to generate electric fields in seawater is that ionic buildup at the antenna or electrodes can limit the effective range and efficiency of such devices. As explained by Stowell, the application of voltage to an antenna or electrode immersed in salt water can cause ions in the water to migrate to the pole of opposite polarity, which results in the creation of "ion gradient" (or so-called "ion shield"). This ion gradient can act as a "potential barrier" that limits the further flow of electrons to the anode, thereby causing a reduction in the electric field transmitted to the surround water. After formation of an ion gradient, prohibitively-high voltage and current levels are required to produce an effective electric field. According to Stowell, the effects of the ion shield can be mitigated by allowing sufficient delay between DC pulses to allow dissipation of the ion gradient. This so-called "off time" (pulse delay) is generally 1 to 2 orders of magnitude greater than the so-called "on time" (pulse width), which may greatly limit the effectiveness deterrent devices employing DC pulse patterns. Thus, there is a need to devise electrical deterrent devices avoiding the adverse effects of ion buildup on an electronic shark deterrent device in saltwater.

An original approach to a method and device for electronic shark deterrence is disclosed in commonly-owned U.S. patent application Ser. No. 12/238,185, filed on Sep. 25, 2008, which is incorporated herein by reference for an explanation of the general background for the improvements disclosed herein. In the original approach, an electronic device creates an output waveform for transmission from at least one pair of electrodes, wherein the output waveform comprises high voltage pulses in the range of 20 to 100 microseconds (μs) having pulse-burst durations of one-half to two-and-one-half seconds repeated at regular intervals.

BRIEF SUMMARY OF THE INVENTION

A first aspect of the present invention is an improved electronic shark deterrent method and device employing a novel output waveform comprising pulse bursts of alternating polarity. The use of pulses of alternating polarity reduces or eliminates the tendency of mineral ions in seawater to migrate toward the device electrodes and foul or reduce the ability of the device electrodes to emit high-voltage electronic pulses at the high repetition rates needed for an effective pulse train. In one embodiment, each positive pulse is followed by a negative pulse, with each pulse having a selected pulse width less than about 100 μs, preferably about 10 μs.

Another aspect of the present invention is a high-efficiency signal format comprising a burst of high-voltage pulses with an irregular timing of intervals between the pulses and using pulses of irregular voltage amplitude. The irregular pulse-delay timing and irregular voltage amplitude impact a shark's body sensors like harsh noise rather than a rhythmical pattern. In one embodiment, the timing of intervals between pulses is varied from 50 to 200 milliseconds (ms), and the voltage amplitude is varied from 150 to 200 Volts (V).

As another aspect of the present invention, a high efficiency signal format employs pulse trains made up of discrete pulse bursts repeated at intervals of less than 5 seconds apart. The delay between pulse bursts of less than 5 seconds improves deterrence by compensating for the ability of some sharks and other aquatic creatures to recover from pulse bursts and re-engage after a short time which may be as short as 5 seconds. In one embodiment, the delay between pulse bursts is selected to be 2.5 seconds and the discrete pulse bursts are configured to have a burst duration of 2.5 seconds.

A further aspect of the present invention is an improved physical structure for an electronic shark deterrent device comprising a thin-profile case and mounting structure for mounting the device to a user's body using a fastener strap. The thin-profile case is configured to have its bulky components, such as the signal charge/discharge capacitor and/or the battery, arranged on lateral sides of an integrated circuit board for the device to reduce its depth. In one embodiment, the electrical components are sealed in a flat case with a mounting structure having a curved shape to allow secure and comfortable mounting on the body of a user.

A further aspect of the present invention is an improved configuration for a fastener strap for attaching the electronic shark deterrent device to the user's body, wherein the device electrodes are embedded within the fastener strap and optimally positioned and buffered to prevent electric shock to the user while ensuring effective deterrence. In one embodiment, the device electrodes are positioned at diametrically-opposite ends of the fastener strap to maximize the distance between the electrodes. An insulative mesh screen may be superimposed over the exposed surface of each electrode to reduce the tendency for electrostatic shock or tingling to the user's skin.

A further aspect of the present invention is an improved device for electronically deterring sharks and other dangerous aquatic creatures, wherein the device includes a sensor for automatically activating its electrode discharge circuit only when the device is immersed in water. The use of a water-contact-sensor for automatic activation improves the water integrity, battery life, and deterrent effectiveness of the electronic shark deterrent device. In a preferred embodiment, the device has one or more LED indicators to allow the user to easily monitor the status of electronic activation by looking at the device from a distance.

Other aspects, features, and advantages of the present invention will be explained in the following detailed description of embodiments thereof, having reference to the appended drawings.

Other objects and features of the present invention will become apparent from the detailed description set forth below when taken in conjunction with the accompanying drawings in which like reference characters identify like parts correspondingly throughout.

BRIEF DESCRIPTION OF THE DRAWINGS

FIG. 2a depicts an oscilloscope trace charting voltage versus time during the application of common-polarity pulses to electrodes immersed in seawater.

FIG. 2b depicts an oscilloscope trace charting voltage versus time during the application of alternating-polarity pulses as used in the present invention to electrodes immersed in seawater.

FIG. 4 is a chart summarizing the results of open-ocean tests of a preferred embodiment of an electronic shark deterrence device emitting a preferred high-voltage output waveform as depicted in FIGS. 3a and 3b.

FIG. 6e is a diagram of a preferred water-detection circuit for an output-waveform-generating circuit.

FIG. 8b shows a cross-sectional view, from the bottom perspective, of the thin-profile electronic control unit depicted in FIG. 8a.

FIG. 9b shows the front-side view of the watertight case depicted in FIG. 9a.

FIG. 9d shows the top-side view of the watertight case depicted in FIG. 9a.

FIG. 9e shows the right-side view of the watertight case depicted in FIG. 9a.

FIG. 10a shows a top-side view of the watertight case attached to a fastener strap containing the device electrodes.

FIG. 10b shows a magnified sectional view of contact-fastening layers used to attach the ends of a fastener strap together.

FIG. 10c shows a magnified sectional view of the device electrode embedded between a protective screen and the main strap of the fastener strap.

FIG. 11 shows a composite-view of the layered structure of the fastener strap.

DETAILED DESCRIPTION OF THE INVENTION

As previously disclosed in U.S. patent application Ser. No. 12/238,185, filed on Sep. 25, 2008, an electronic shark deterrent device can deter sharks from remaining in proximity to a person or area of human activity by producing a high-voltage output waveform from a pair of electrodes, wherein the output waveform comprises a train of bursts of high-voltage electronic pulses of pulse width in the range of 20 μs to 100 μs and having a burst duration of one-half to two-and-one-half seconds followed by a rest interval and repeated at regular intervals.

As a first aspect of the present invention, an improved high-efficacy output waveform for an electronic shark deterrent device comprises high-voltage pulse bursts made up of a series of alternating-polarity pulses. By using pulses of alternating polarity, the tendency of ion migration to and buildup on the device electrodes is significantly reduced or eliminated, thereby maintaining the efficacy of the device output to deter sharks. Applying a voltage across the electrodes creates an electric field, whose magnitude is determined by the voltage applied and the distance between the electrodes. The electric field decreases as the distance between the electrodes increases. It is this electric field, or signal, that disturbs the electroreceptors of sharks, rays, skates, electric eels and other members of the aquatic Elasmobranchi subclass. As voltage is maintained between the electrodes, the electric field generated between them can cause ions in saltwater to move to an opposite-pole electrode, such that positive ions migrate to the negative electrode (the anode) and negative ions migrate to the positive electrode (the cathode).

As ion migration between the electrodes increases, the effective electric field may decrease. After a short time, ion accumulation can mask the electrodes as the amount of positive and negative ions at each electrode build up to form an ion gradient. This ion gradient, or so-called "ion shield", creates a "potential barrier," which can restrict current between the electrodes and, thereby, reduce the electric field transmitted to the surrounding water at a given voltage. The effective electric field in the surrounding water can remain negligible as long as the voltage is applied to the electrodes, which may render the device ineffective at deterring sharks and other Elasmobranchi. Under these conditions, impractically large amounts of current may be required to overcome the potential barrier.

Figure 1:
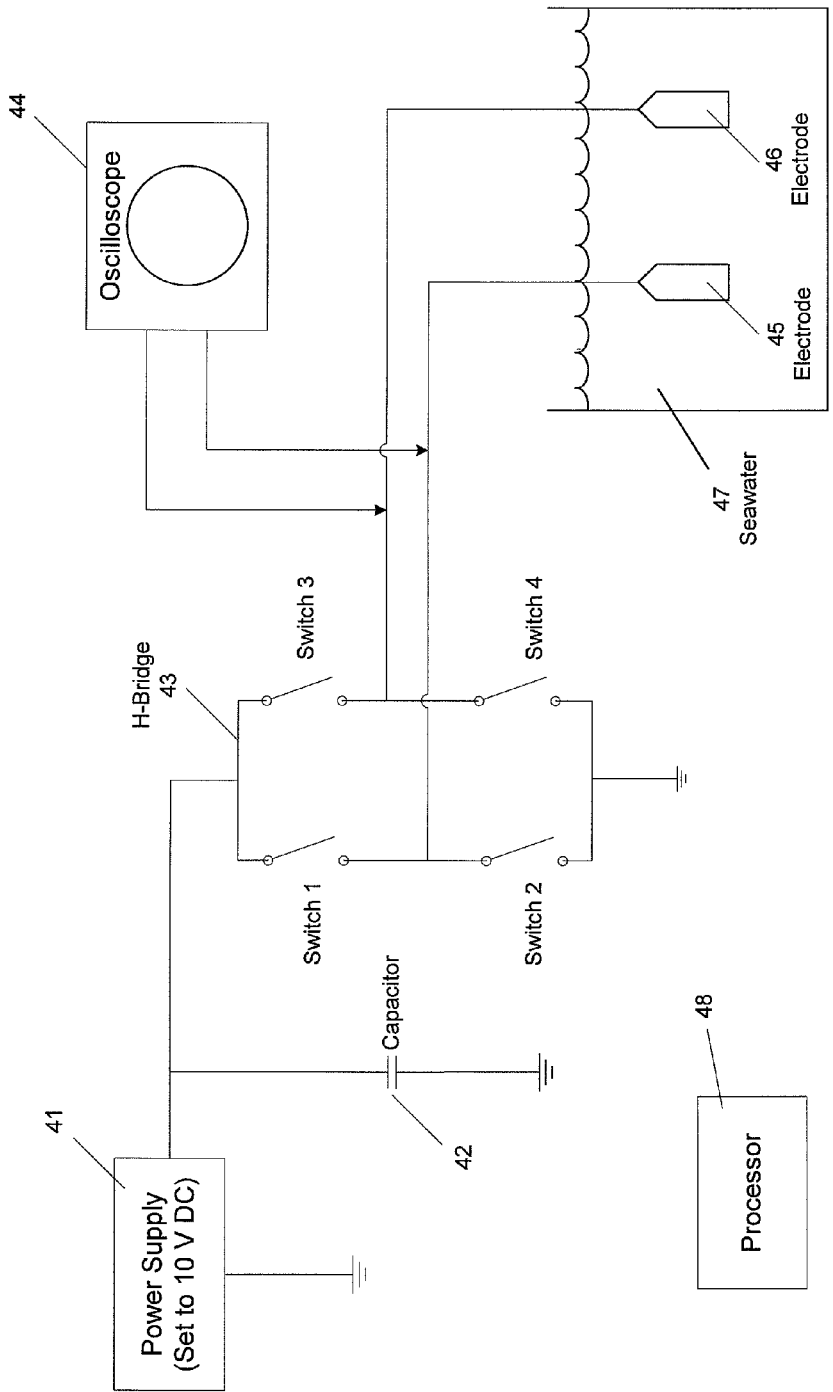
FIG. 1 is a diagram of a pulse-generating circuit for generating an output waveform for deterring sharks in accordance with the present invention, with a test circuit used to test the pulse-generating circuit output for effects of ion migration on electrodes immersed in seawater.

The effects of ion migration on the electric field created by the device electrodes may be shown in simulation tests measuring seawater conductivity following application of a high-voltage output waveform to the electrodes. FIG. 1 shows a diagram of an output-waveform-generating circuit and test circuit used to test the effects of ion migration on electrodes immersed in seawater. This test circuit consisted of a 10 V DC power supply 41, capacitor 42, H-Bridge 43, two electrodes 45 and 46 immersed in seawater 47, a processor 48, and an oscilloscope 44 configured to measure voltage across the electrodes. The electrodes 45 and 46 are comprised of a woven stainless steel mesh fabricated as 1 inch squares. The test circuit operated by using the processor 48 to generate signals to the power supply 41 and H-Bridge 43. To measure saltwater conductivity, the power supply 41 first charges the capacitor to +10 V. The processor 48 then synchronizes the H-Bridge 43 (and the closing of switches ¼ or ⅔ depending upon the polarity of the pulse to be generated) to generate either a common-polarity or alternating-polarity waveform transmitted to the electrodes. Finally, the pulses and resulting baseline voltage are measured using the oscilloscope 44.

Experiments with the test circuit in FIG. 1 showed that applying alternating-polarity pulses to electrodes immersed in seawater reduces or eliminates the formation of an ion gradient, and increases conductivity resulting in an unimpeded discharge of electrical charge over time, compared to when common-polarity pulses are used for the output waveform. FIG. 2a depicts a sample oscilloscope trace charting voltage versus time for the application of common-polarity pulses to electrodes immersed in the seawater bath of the test circuit. In this experiment, each pulse burst 6 is comprised of a series of common-polarity pulses 7 having pulse widths of 30 µs, separated by 30 µs pulse delays 8. A marked increase in baseline is observed indicating the residual buildup 9 of an ion gradient, and decay interval 10 showed a measurable half-life following termination of the pulse burst 6. The amplitude of the pulses 7 was steady at +10 V indicating that the power supply 41 was able to maintain voltage regulation. In this experiment the baseline is a measurement of voltage across the electrodes 45 and 46 when the power supply 41 is disconnected via the switch from the positive electrode. A voltage near or at zero at the positive electrode indicates no ion buildup, whereas a voltage above zero (residual buildup 9) indicates ion buildup.

FIG. 2b depicts the oscilloscope trace charting voltage versus time for the application of alternating-polarity pulses to the test circuit. In this experiment, each pulse burst 11 is comprised positive pulses 12 followed alternatively by negative pulses 14, each having a pulse width of 30 µs, and separated by a fixed pulse delay 13 of 30 µs. No net ion gradient is formed—presumably due to the cancelling effect of using alternating-polarity pulses. Voltage amplitudes of the pulses drop consistently throughout the progression of the pulse burst 11 indicating maximum conductivity through the saltwater and the discharging of the capacitor 42.

Figure 3A:
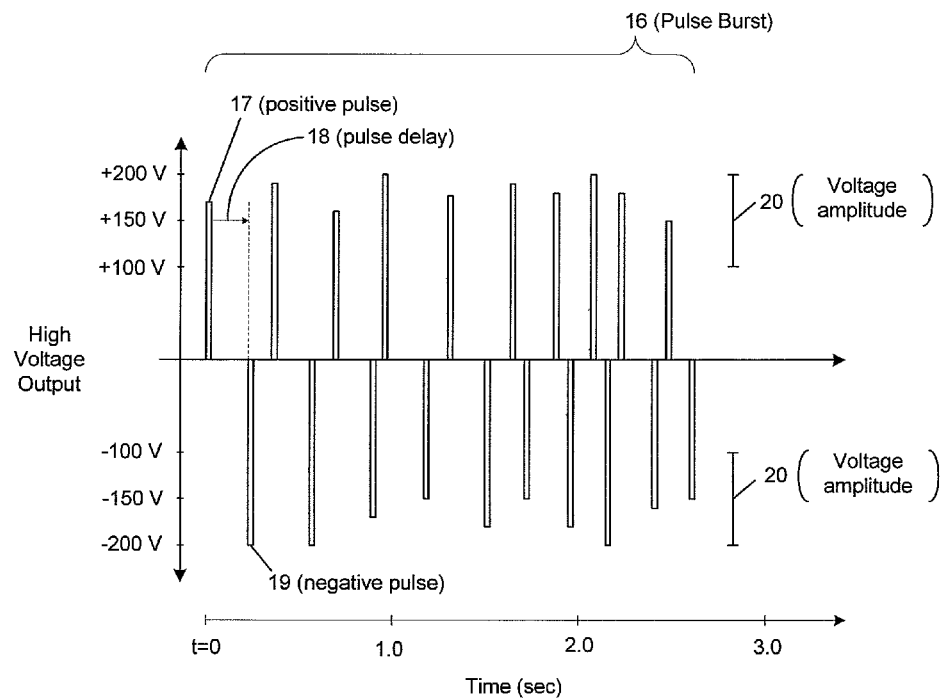
FIG. 3a illustrates a discrete pulse burst comprising alternating-polarity pulses having irregular timing intervals between the pulses and using pulses of irregular voltage amplitude.

Based in part on the results using the test circuit described above, a preferred output waveform for the electronic shark deterrent device comprising pulse bursts of alternating polarity pulses and short pulse widths was devised. FIG. 3a illustrates an example of a pulse burst 16 comprised of a series of pulses of alternating polarity. In one embodiment, each pulse burst 16 is comprised of a series of a positive-amplitude pulse 17 followed by a negative-amplitude pulse 19, each separated by a pulse delay 18. As an alternative, two or more pulses of one polarity can be followed by two or more pulses of the opposite polarity, each pulse being separated by a pulse delay. In the preferred embodiment, each pulse burst 16 is comprised of 30 or less pulses, preferably about 20 pulses, such that the number of pulses is modulated to maintain an average pulse frequency of about 6 to 12 cps. In the preferred embodiment, the duration (pulse width) of each pulse is fixed at a value less than about 100 µs, preferably about 10 µs. The use of short pulse widths at high voltages is effective in deterring sharks and other aquatic creatures using less power and reducing the size of the device. In other embodiments, the duration (pulse width) of the pulse may be programmed to vary from pulse to pulse.

As another aspect of the invention, pulse bursts that are comprised of fixed-amplitude pulses separated by a fixed period of delay are found to be not as effective at deterring sharks and other members of the Elasmobranchi subclass. Sharks and other aquatic creatures may be less deterred by electronic pulses having a rhythmical pattern. A high-efficiency signal format was therefore devised for deterring sharks and other aquatic creatures using a non-rhythmical pattern of electrical pulses.

Referring again to FIG. 3a, the series of alternating-polarity pulses are shown having their pulse delay 18 and voltage amplitude 20 varied to create non-rhythmical or irregular pulse waveforms. The use of irregular voltage 20 and pulse delay 18 improves the deterrent effect by substituting rhythmical patterns generally believed to be more tolerable by sharks and other members of the Elasmobranchi subclass with non-rhythmical or irregular patterns likely perceived as loud noise to these aquatic creatures. It is found that the non-rhythmical effect is obtained with irregular pulse delays 18 that may be varied from about 10 to 500 ms and with irregular voltage amplitudes 20 that may be varied from about 50 to 400 V. In preferred embodiments, irregular pulse delays 18 are varied from about 50 to 200 ms and the irregular voltage amplitudes 20 are varied from about 150 to 200 V. In other embodiments, the pulse delays 18 are irregular and the voltage amplitudes 20 are constant. In still other embodiments, the pulse delays 18 are constant and the voltage amplitudes 20 are irregular.

It was observed that some sharks and other members of the Elasmobranchi subclass may be able to recover from the effects of pulse bursts when the delay between pulse bursts is more than about 5 seconds. Early recovery may allow this subset of aquatic creatures to re-engage the user before subsequent bursts. A high-efficacy signal format was devised for deterring sharks and other aquatic creatures wherein the duration 40 between pulse bursts is less than about 5 seconds.

Figure 3B:
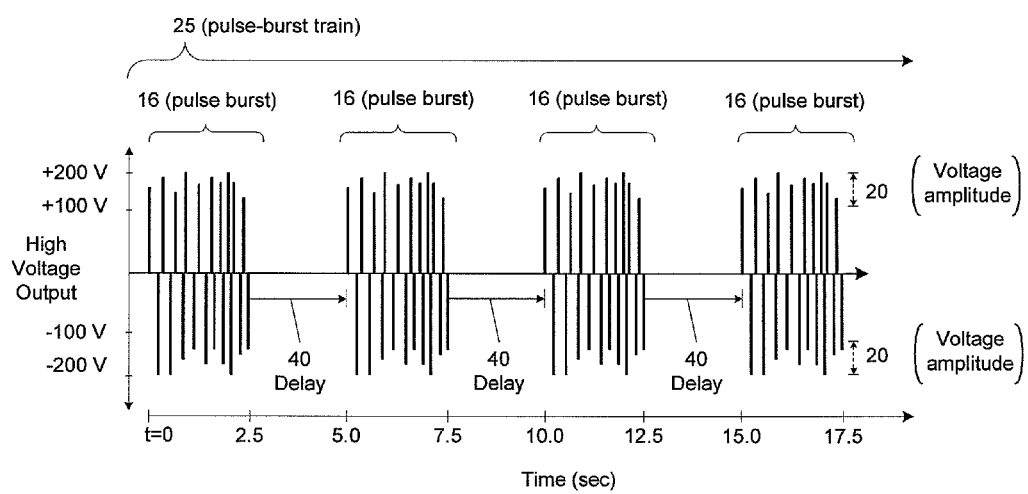
FIG. 3b illustrates an output waveform for a preferred embodiment comprising a train of discrete pulse bursts with a delay between bursts of less than about 5 seconds.

FIG. 3b illustrates an embodiment of a pulse-burst train 25, wherein the pulse burst 16 has a period of about 2.5 seconds, and the delay 40 between bursts is about 2.5 seconds. The use of delays 40 less than about 5 seconds improves deterrent effectiveness by compensating for the ability of some sharks and other Elasmobranchi to recover from pulse bursts 16 and re-engage the user before a subsequent pulse burst. In other embodiments, the discrete pulse bursts 16 and/or the delays 40 between pulse bursts may have variable durations.

Field tests showed that use of pulse trains 25 comprised of alternating-polarity pulses 16, wherein the pulse delay 18 is varied between about 50 and 200 ms and the voltage amplitude 20 is varied between about 150 to 200V, are very effective at deterring sharks in open-ocean conditions. FIG. 4 shows a table of results for tests carried out on the same day in a known feeding area inhabited by Grey Reef, Galapogos and White Tip Reef Sharks near the Island of O'ahu, Hawai'i. Four divers were present and the tests were recorded using a video camera.

In the first test (Exp. No. 1), a cylindrical mesh bag was filled with approximately 25 pounds of fish bait and suspended to a depth of approximately 85 feet above the known feeding area. An Electronic Shark Deterrence device emitting the pulse train 25 described above was suspended approximately 2 feet from the mesh bag. In this test, multiple sharks attempted to approach and bite the mesh bag, but were all repelled by the presence of the deterrence device. No shark approached close enough to tear the mesh bag. One shark that attempted to bite the deterrence device was instantly repelled after appearing to sustain an electrical shock. The mesh bag was never bitten or damaged while the deterrence device was positioned approximately 2 feet away.

In the next test (Exp. No. 2), the mesh bag containing the fish bait was left in the feeding area, but the Electronic Shark Deterrence device was removed. Within seconds of removal of the deterrence device, multiple sharks bit and ripped open the mesh bag releasing all of the bait fish into the surrounding water causing a feeding frenzy involving approximately 30 sharks.

In the third test (Exp. No. 3), fish bait was continuously spread around the same feeding area to entice sharks, attracting up to 30 sharks to the area. A diver holding the Electronic Shark Deterrence device in his hand then entered the feeding zone. Sharks attempting to approach the diver within a distance of 10 feet immediately turned away and left, even when fish bait was in close proximity to the diver. Although numerous approaches were attempted by sharks, at no time was the test diver bitten or harmed by contact from a shark.

As an additional advantage, the high-efficacy signal format is found to have improved battery life. In one embodiment, the deterrence device emitted pulse patterns with voltage amplitude varied between about 200 and 300 V for approximately 5 hours using a rechargeable lithium-ion battery rated at 750 milliampere-hour (mAh). In another preferred embodiment, the deterrence device emitted pulse patterns with voltage amplitude varied between about 150 and 200V for approximately 9 hours using a rechargeable lithium-ion battery rated at 1.5 Ah.

Figure 5:
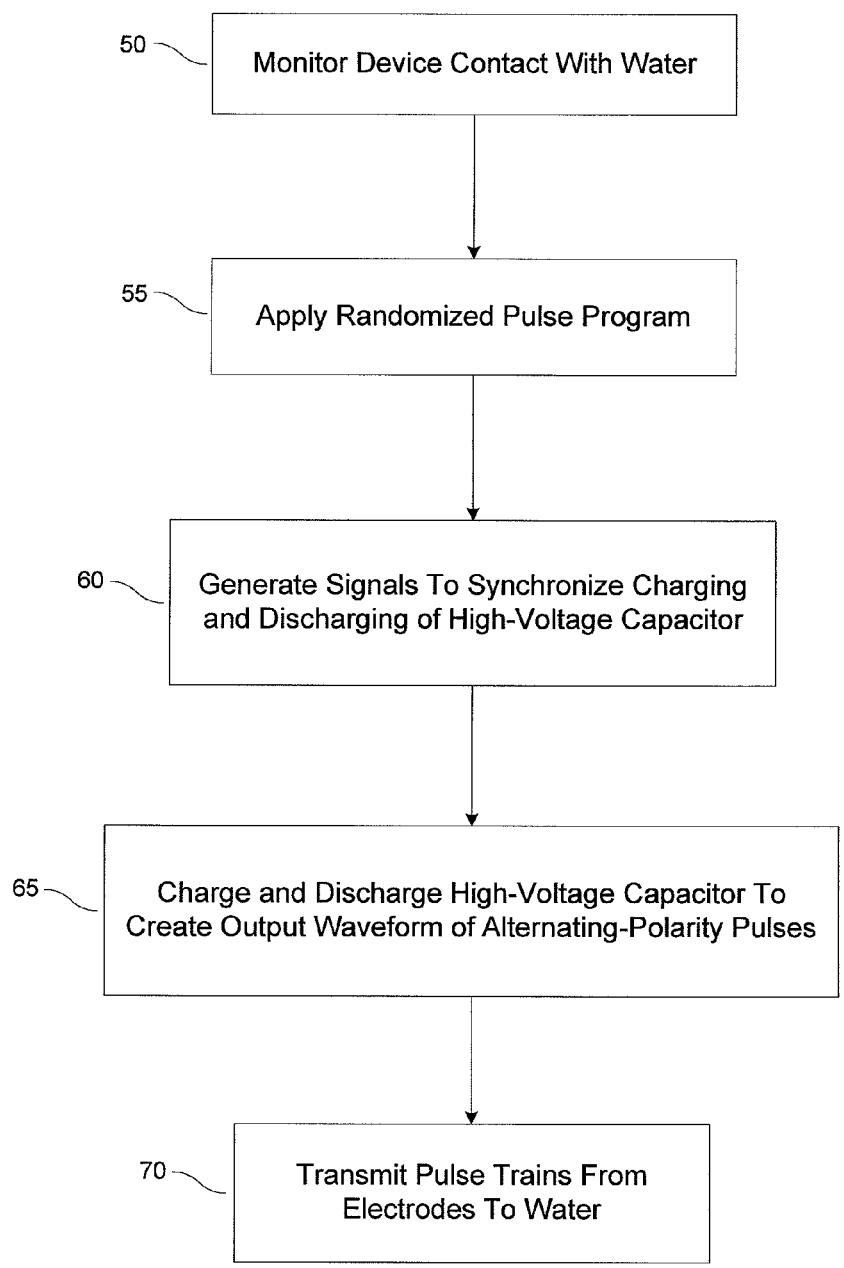
FIG. 5 is a block diagram of a preferred method of electronically deterring sharks and other dangerous aquatic creatures using a pulse-generating circuit for generating alternating-polarity pulses when activated by contact with water.

A further aspect of the present invention is an improved method wherein the deterrence device is kept inactive until it is automatically activated by contact with water. FIG. 5 shows a flow chart of the improved method.

In step 50, the processor measures feedback from a sensor, electrode, or combination of sensors and/or electrodes, to determine whether the electronic shark deterrence device, and/or the electrodes, is in contact with water.

In step 55, if the device, and/or the electrodes, is in contact with water then the processor executes a randomized pulse program to deter sharks and other aquatic creatures from the vicinity of the user.

In step 60, the processor generates signals to synchronize the charging and discharging of a high-voltage capacitor.

In step 65, the high-voltage capacitor is charged and discharged by the synchronization of signals to create an output waveform comprising pulse trains made up of a series of alternating-polarity pulse bursts, wherein the delay between pulses and the voltage amplitude of the pulses may be varied.

In step 70, the output waveform is transmitted from the electrodes in contact with water to deter sharks and other members of the aquatic Elasmobranchi subclass from the vicinity of the user.

Figure 6A:
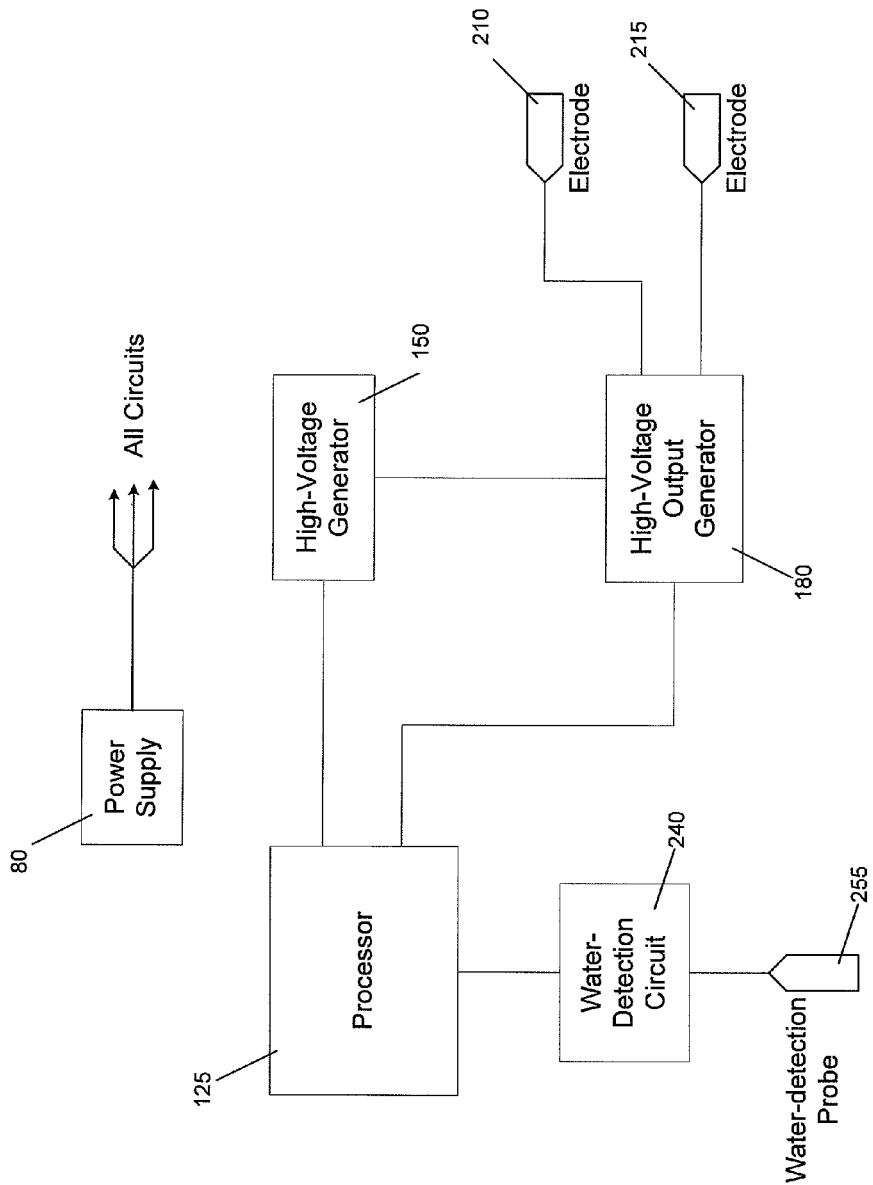
FIG. 6a is a diagram of a preferred output-waveform-generating circuit with water detection probe.

Referring to FIG. 6a, there is shown a diagram of an embodiment of an output-waveform-generating circuit adapted to create pulse bursts of alternating-polarity pulses, capable of producing variable pulse delays and voltage amplitudes, and activated by contact of the deterrent device with water. The main components this embodiment of the improved output-waveform-generating circuit include a power supply 80, a processor 125, a high-voltage generator 150, a water-detection circuit 240, a water-detection probe 255, a high-voltage output generator 180, and a pair of electrodes 210 and 215.

Figure 6B:
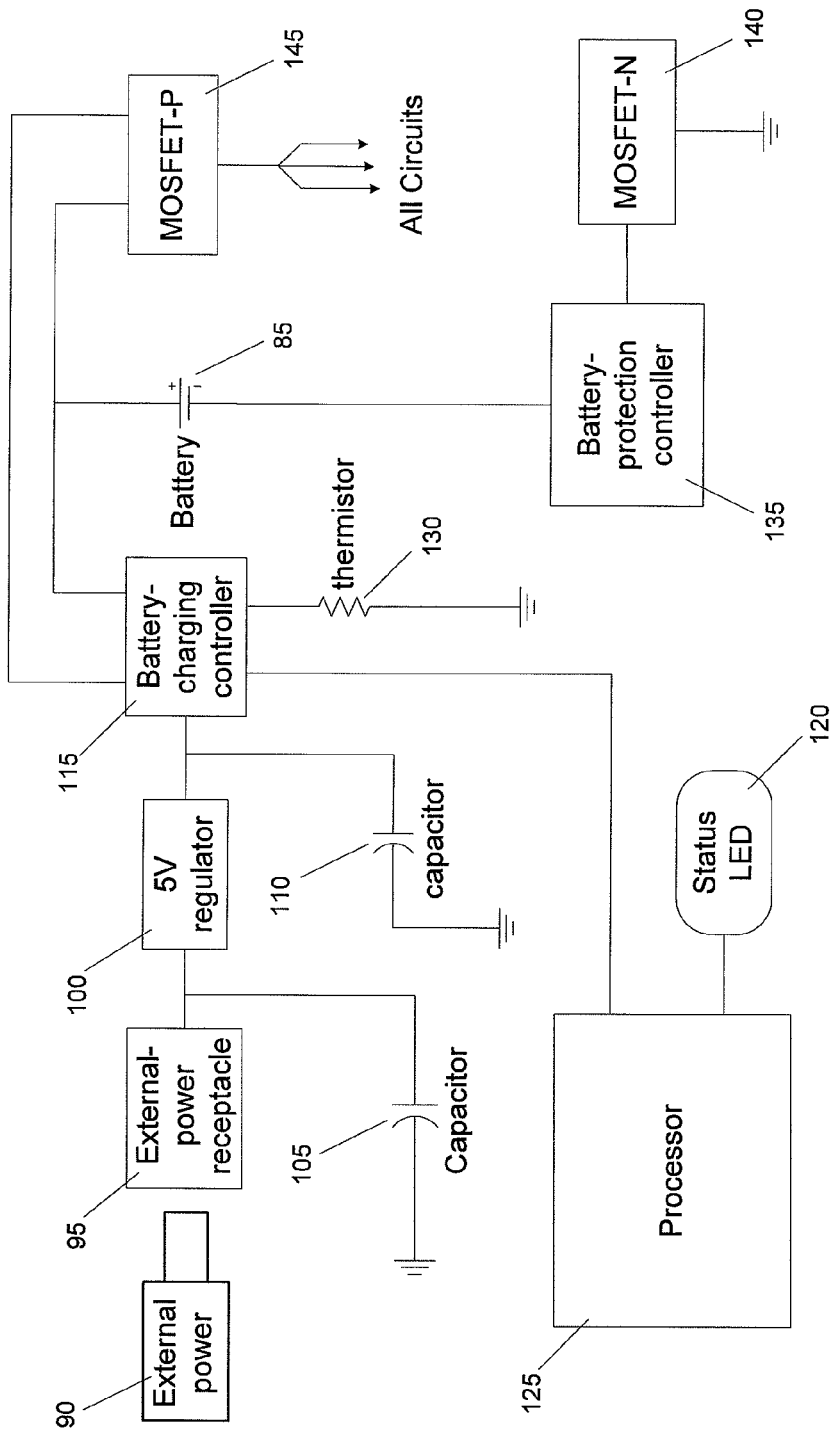
FIG. 6b is a diagram of a preferred battery recharging circuit for a preferred embodiment of the electronic shark deterrent device.

FIG. 6b shows an example of the power supply 80 depicted in FIG. 6a having a rechargeable battery 85 with associated charging and protection circuits. Battery charging commences when external power source 90 is applied to an external-power receptacle 95. The external power source 90 may be connected by an adapter plug from an off-the-shelf AC-to-DC (6V DC) converter using a standard 120V wall plug. In another embodiment, the external power source may be an inductive power supply. The advantage of using an inductive power supply would be to eliminate the need for the external-power receptacle 95 in the device, thereby improving the integrity of the electronic shark deterrence device against water intrusion.

In the embodiment depicted in FIG. 6b, power from the external-power receptacle 95 is conditioned with a 5 V regulator 100 and capacitors 105 and 110. The regulated 5 V power is applied to a battery-charging controller 115, which detects the state of the battery 85 and charges it as necessary. A battery-protection controller 135 and a dual MOSFET-N 140 ensure that the battery is charged and discharged within voltage and current specifications. Any current or voltage out of battery specifications causes the battery-protection controller 135 to turn the dual MOSFET-N 140 off, thereby disconnecting the battery 85 from the circuit with the power supply. Under normal battery conditions, the battery-protection controller 135 turns the dual MOSFET-N 140 on connecting the battery 85 to the rest of the circuit. A MOSFET-P 145 switches power between the battery 85 and the 5 V regulator 100. When power is not applied to the external-power receptacle 95, MOSFET-P 145 is on and the battery 85 provides power to all circuits for the device. When external power source 90 is applied to the external-power receptacle 95, MOSFET-P 145 is switched off, and the external power is supplied from the 5 V regulator 100 to charge the battery 85 and the other circuits. External power 90 being applied to the external-power receptacle 95 also causes the processor 125 to shut down signals to the high-voltage generator 150 and the high-voltage output generator 180 (see FIG. 6a).

In some embodiments, the output-waveform-generating circuit may include a status light-emitting diode (LED) 120 or other light-emitting source. With status LED 120 present, charging-status signals from the battery-charging controller 115 are routed to the processor 125, which causes the status LED 120 to illuminate or blink a certain color (e.g., red) while the battery is charging. When charging is complete, the processor 125 causes the status LED 120 to illuminate or blink a different color (e.g., green).

In some embodiments, the power supply 80 may include a thermistor 130, which is used to monitor battery 85 temperature during charging. With thermistor 130 present, the battery-charging controller 115 can stop charging of the battery 85 if the battery temperature exceeds normal charging conditions.

Figure 6C:
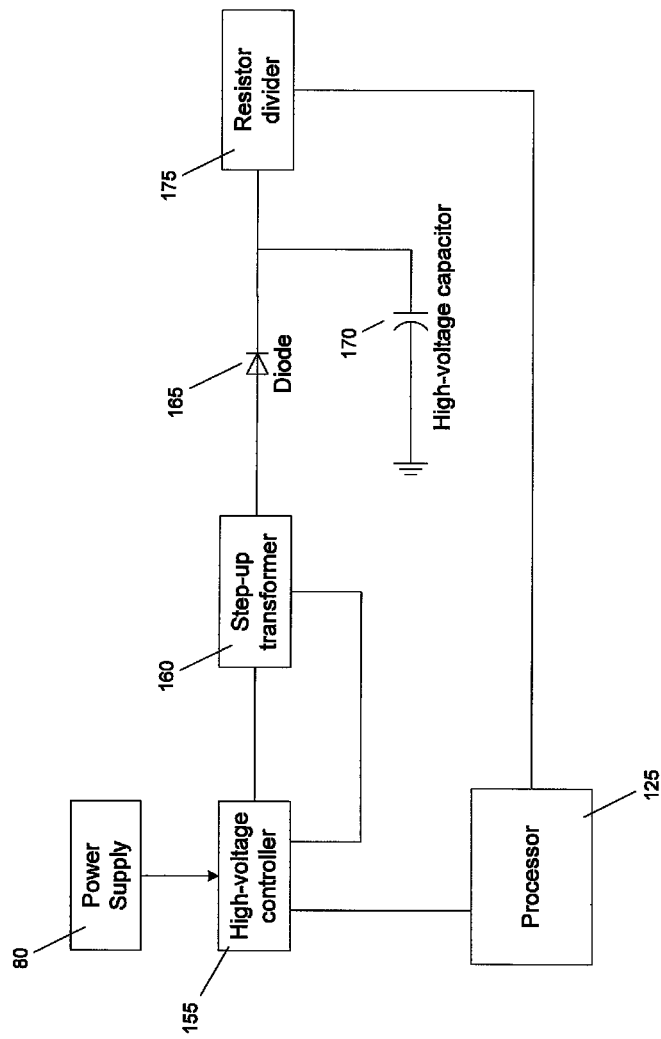
FIG. 6c is a diagram of a preferred high-voltage generator for an output-waveform-generating circuit.

FIG. 6c shows an example of the high-voltage generator 150 depicted in FIG. 6a having a high-voltage controller 155, which pulses a step-up transformer 160. A diode 165 rectifies the step-up transformer 160 output to charge a high-voltage capacitor 170. A resistor divider 175 proportionally reduces the high voltage from the high-voltage capacitor 170, and is used to provide feedback to the processor 125. The processor pulse width modulates the high-voltage controller 155 to optimize power usage and to control the level of high voltage in the high-voltage generator 150.

Figure 6D:
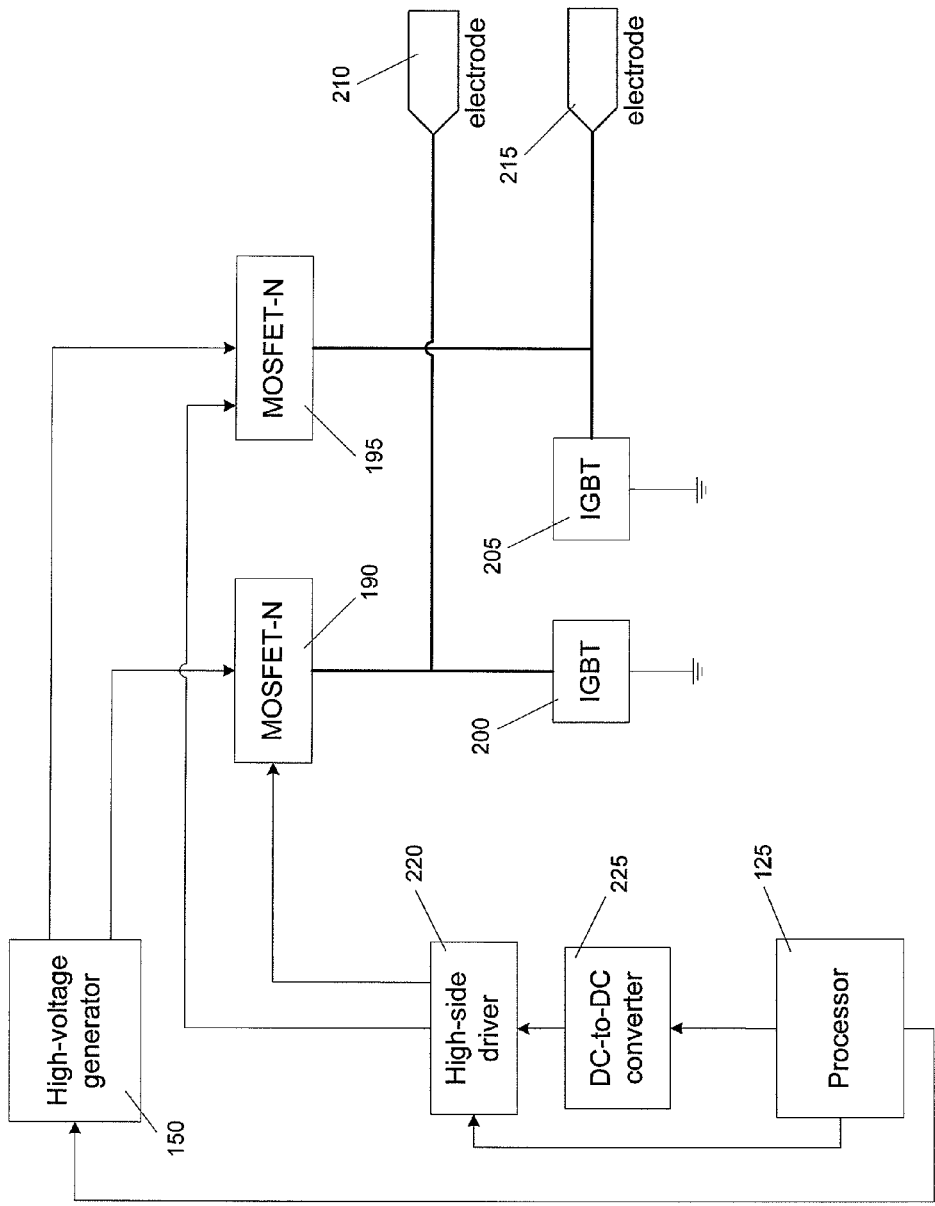
FIG. 6d is a diagram of a preferred high-voltage output generator for an output-waveform-generating circuit.

FIG. 6d shows an example of the high-voltage output generator 180 depicted in FIG. 6a having an H-bridge circuit comprising two MOSFET-N transistors 190 and 195 and two IGBT transistors 200 and 205, which send pulses to the two electrodes 210 and 215. High-voltage pulses are generated by switching on and off the MOSFET-N and IGBT pairs 190/205 and 195/200, respectively. Alternating-polarity pulsing is thus achieved by alternating switching between these pairs. A high-side driver 220 and a DC-to-DC converter 225 are used to bias the MOSFET-N transistors 190 and 195 for proper switching.

FIG. 6e shows an example of the water-detection circuit 240 depicted in FIG. 6a comprising pull-down resistors 230 and 235 connected to electrodes 210 and 215, and water-detection probe 255 connected through diode 250 and resistor 245 to the processor 125, which applies a positive voltage to resistor 245 when testing for water submersion. In this embodiment, the processor 125 checks for water submersion when the device is inactive with high-voltage-output generator 180 off and no output pulses being generated. When the water-detection probe 255 is immersed in water 257 with the electrodes 210 and 215, a current path is established between the probe, the electrodes, and the pull-down resistors 230 and 235, and a voltage drop is detected across resistor 245 by the processor 125, which then sends signals to activate the high-voltage-output generator 180 to apply high-voltage pulses to the electrodes. When the device is taken out of the water, there is no current path between the probe and the electrodes, so no voltage drop across resistor 245 is detected by the processor 125, which then sends signals to turn off the high-voltage-output generator 180. If only the water-detection probe 255 is submerged and both electrodes 210 and 215 are out of the water, then there is still no current path and the processor will read approximately 5 V and will disable high-voltage signal generation. If the water-detection probe 255 and one of the electrodes 210 or 215 is submerged, then a current path is established between one of the pull-down resistors 230 or 235 such that the voltage drop across resistor 245 is less than when both electrodes are submerged and the processor may or may not initiate pulse burst depending upon its programming.

The control of the water-detection probe 255 may be configured to initiate pulse activation based on the submergence of fewer components or other components added to the device. Algorithms may be programmed into the processor 125 to provide enhanced control to ensure that the electronic shark deterrent device is properly submerged before pulses are generated, depending upon different triggers for different environments or applications. For example, a delay and averaging of successive readings by the processor may be used to prevent or minimize false water detection (and activation). In a preferred embodiment, a delay of between about 10 to 200 ms, preferably about 100 ms, is used to prevent or minimize false water detection. Other delay values may be programmed to prevent or minimize false activation under different conditions, or the delay may be omitted. Alternatively, water detection and pulse generation may be enabled only if the device is activated manually, remotely or automatically.

In a preferred embodiment, the processor 125 is a low-power device programmed to: monitor battery charging, control high-voltage generation, control high-voltage-output (pulse) generation, detect water submersion, and provide status information using a status LED or other light-emitting device. The processor 125 may be an integrated circuit comprised of timers, multiplexed analog-to-digital (A/D) converted inputs, random-access memory (RAM), program memory, input/output ports, a clock oscillator, and other peripherals. The logic of the processor 125 may be implemented using the "C" programming language or other applicable languages.

Figure 7:
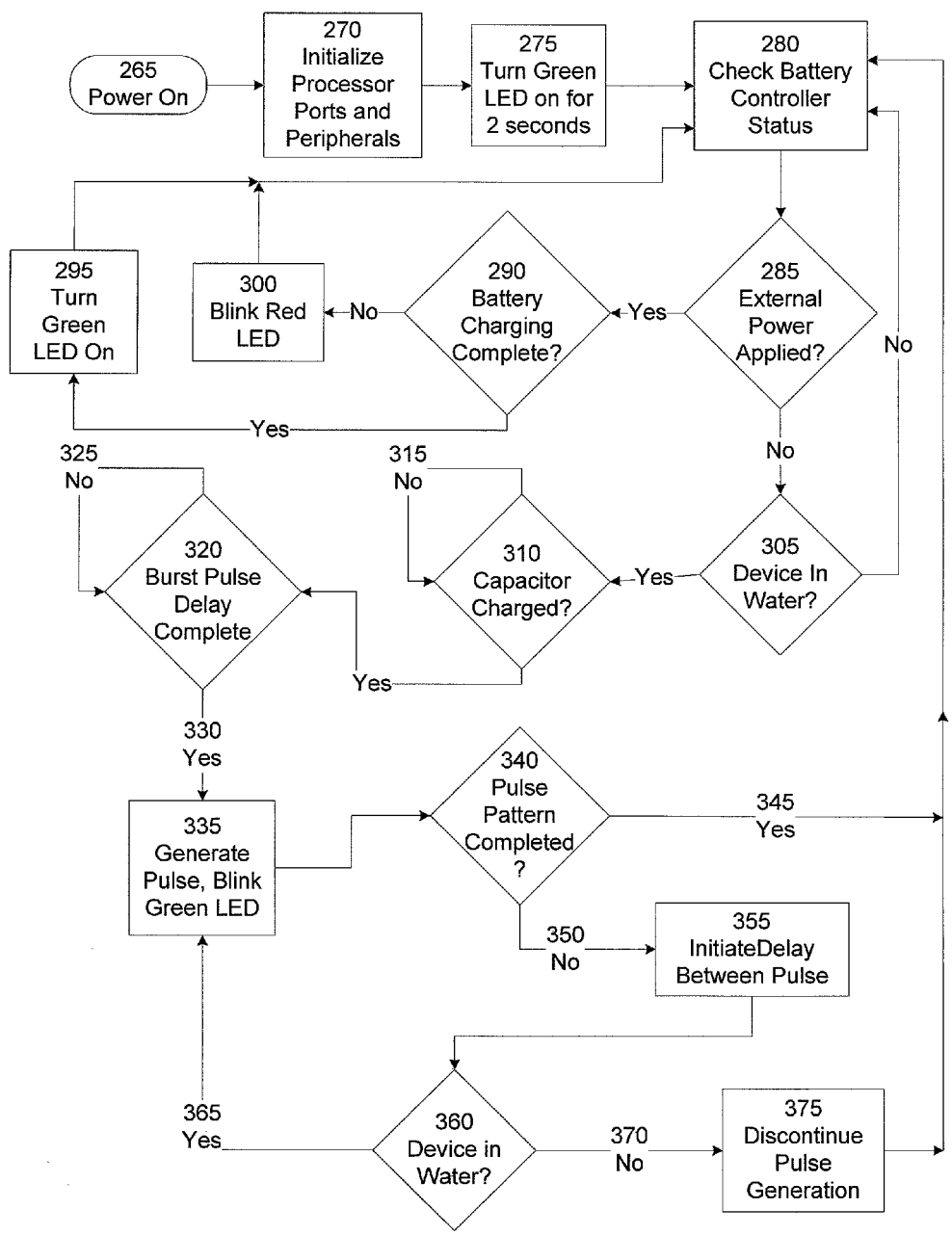
FIG. 7 is a flowchart diagram depicting a preferred programming logic for a processor used in an output-waveform-generating circuit.

FIG. 7 is a flowchart of a preferred programming logic for the processor 125. At step 265 a power-on activation condition is detected, and the processor and input/output ports and peripherals are initialized in step 270. Initialization is indicated in step 275 by turning the green light of the status LED for a period of time. Thereafter, in step 280 the processor checks the status of the battery-charging controller to determine in test 285 if external power is being applied to the external-power receptacle. If the test determines that external power is being applied, then the processor checks in test 290 whether battery charging is complete. If yes, then this is indicated by turning the green status LED on in step 295. If battery charging in not complete, then this is indicated by illuminating or blinking the red status LED 300. If battery charging is not complete, then the processor causes the battery-charging controller to charge the battery.

If the processor determines that external power is not being applied in step 285, then the processor checks in test 305 whether the device is in contact with water. If no, then control is returned to step 280. If yes, then the processor checks in test 310 whether the high-voltage capacitor is charged. If not, it continues to check in loop 315 until charging is complete. If complete, the processor will check whether a programmed delay period following a previous pulse burst is complete in test 320. If not, then the processor will not initiate the next pulse burst generation during loop 325 until the delay period is complete. If complete at 330, then the processor in step 335 will initiate pulse generation and cause the status LED to illuminate or blink green.

The processor monitors whether the programmed pulse burst pattern is complete in test 340. When the programmed pulse burst pattern is complete at 345, the processor programming logic reverts back to its pre-burst stage and returns to step 280. If the programmed pulse burst pattern is not complete at 350, then the processor initiates a programmed delay to follow the pulse burst in step 355. The processor again determines whether the device is in contact with water in test 360. If yes at 365, then the processor cycles back to step 355 and continues to generate the next pulse burst. If the device is not in the water at 370, then the processor discontinues pulse-burst generation at step 375 and reverts back to its pre-burst stage in step 280.

A further aspect of the present invention is an improved physical structure for an electronic shark deterrent device in a thin, compact and lightweight design that is readily integrated into mobile, watertight devices that may be affixed to the user's body, or to other objects, in a variety of manners for use in the water.

Figure 8A:
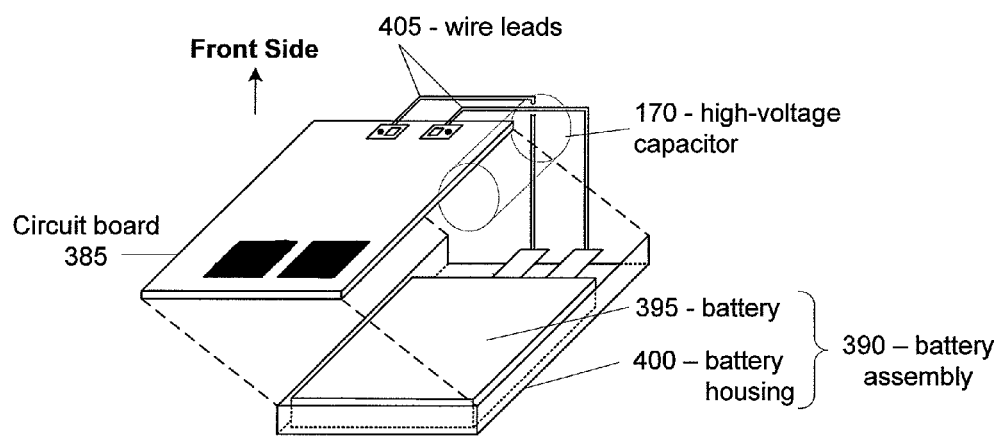
FIG. 8a shows a three-dimensional, disassembled view of a preferred thin-profile electronic control unit for an electronic shark deterrent device.

FIG. 8*a* is a schematic drawing of assembly of the electronic control unit for the device. The device circuit board 385 is formed in a plane with its front side carrying output contacts for external leads to the output electrodes facing up. A battery assembly 390 includes a flat rechargeable battery 395 integrated within a planar battery housing 400. The battery 395 is electrically connected to the circuit board 385 via two wire leads 405. The planar circuit board 385 fits on top (on the front side) of the battery assembly 390 in order to occupy a minimum device depth.

Figure 8B:
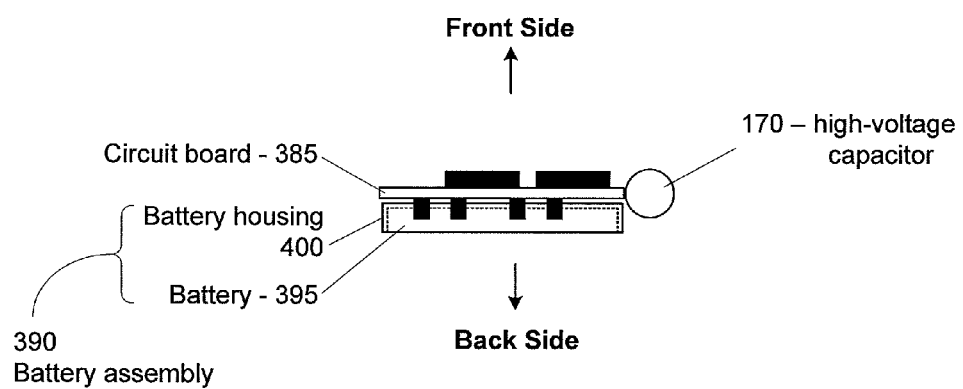

FIG. 8*b* shows a cross-sectional bottom-view of the assembled control unit 380 for the embodiment depicted in FIG. 8*a*. In this embodiment the high-voltage capacitor 170 which is commercially available as a large cylindrical component is positioned on one lateral side in parallel with the length of the circuit board 385 and battery assembly 390 so as not to add to the minimum depth of the device. The combined assembly can then be sealed in a thin, flat case with watertight sealing.

Figure 9A:
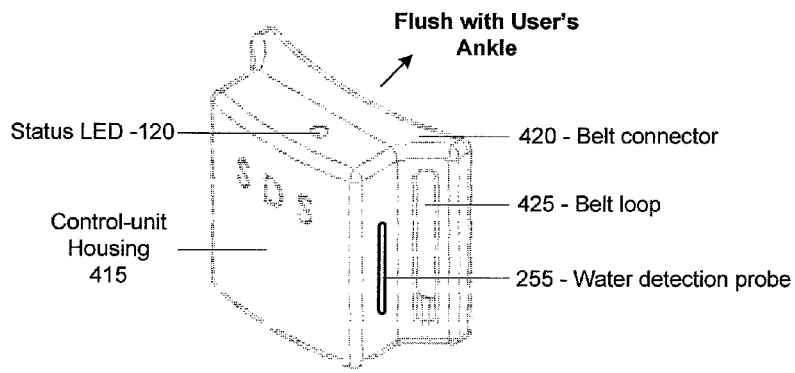
FIG. 9a shows a front side, three-dimensional view of a preferred form of watertight case for an electronic shark deterrent device.

FIGS. 9*a* through 9*f* illustrate a preferred embodiment of a watertight case for the electronic shark deterrent device. The watertight case comprises a housing 415 for the electronic control-unit mounted on a belt connector structure 420. FIG. 9*a* illustrates the control-unit housing 415 positioned on the belt connector 420 to face outwardly from the user's body. The belt connector 420 has a curved inner surface for mounting on a user's body part, such as an ankle, wrist, or elbow. On its opposite lateral ends it has a pair of belt loops 425 designed to accommodate a fastener strap. A status LED 120 is positioned on a top end of the control-unit housing 415, such that the user can easily monitor the status of the electronic shark deterrent device while wearing the device by simply looking towards the device. A water-detection probe 255 is positioned on one side of the control-unit housing 415 to ensure water detection when the device is submerged and termination of pulse activation when the device is removed from the water.

Figure 9B:
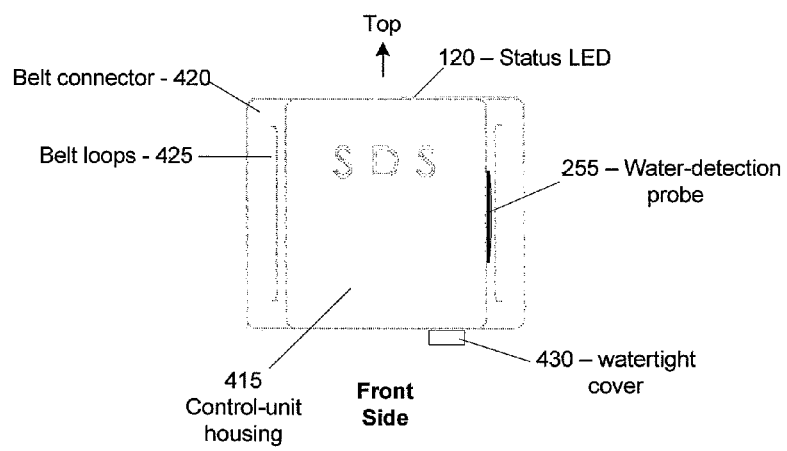

FIG. 9*b* shows a front view of the device case having the belt loops 425 on the right and left side of the belt connector 420, the status LED 120 facing upward (towards the user's head), and the water-detection probe 255 on the right side of the control-unit housing 415.

Figure 9C:
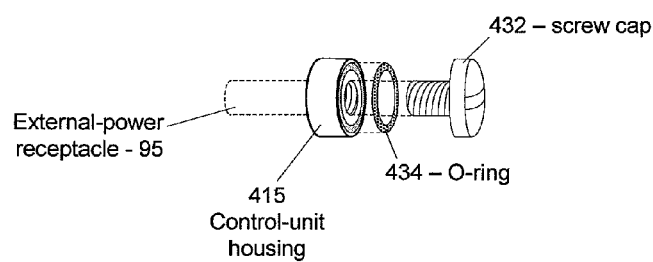
FIG. 9c shows an example of a water seal for a battery recharging receptacle of the watertight case.

FIG. 9*c* is an exploded diagram illustrating a watertight assembly for the external power receptacle 95 for the battery charging circuit, which is mounted by a bushing held in the control-unit housing 415. The bushing has internal threading for receiving a threaded screw cap 432 for closure, which is sealed by O-ring 434. In some embodiments, external power may be provided using an inductive power source, thereby omitting the need for the case to incorporate an external power receptacle and watertight cover. The external power receptacle 95 may be protected from water intrusion using other means for providing a watertight seal, as understood by those skilled in the present art.

Figure 9D:
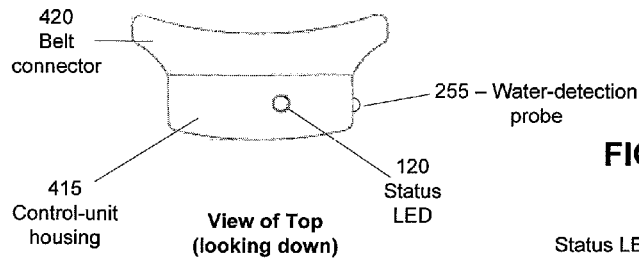

FIG. 9*d* shows a top view of the device case depicted in FIG. 9*a*. The positioning of the status LED 120 on top of the control-unit housing 415 enables the user to easily monitor the status of the device by glancing at the top of the case.

Figure 9E:
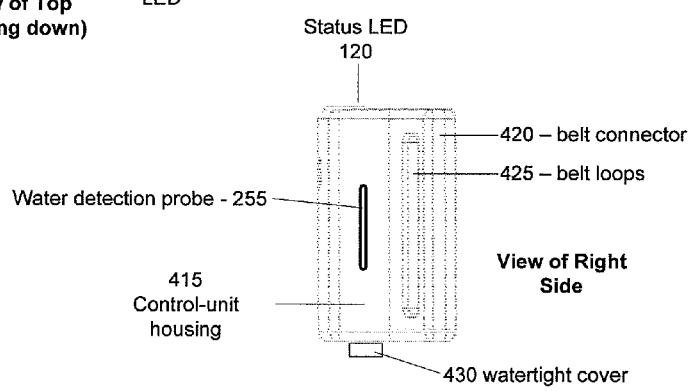

FIG. 9*e* shows a right-side view of the device case showing the thin profile of the control-unit housing 415 and position of the belt loops 425 through which a fastener strap may be passed to attach the case on the user's body.

Figure 9F:
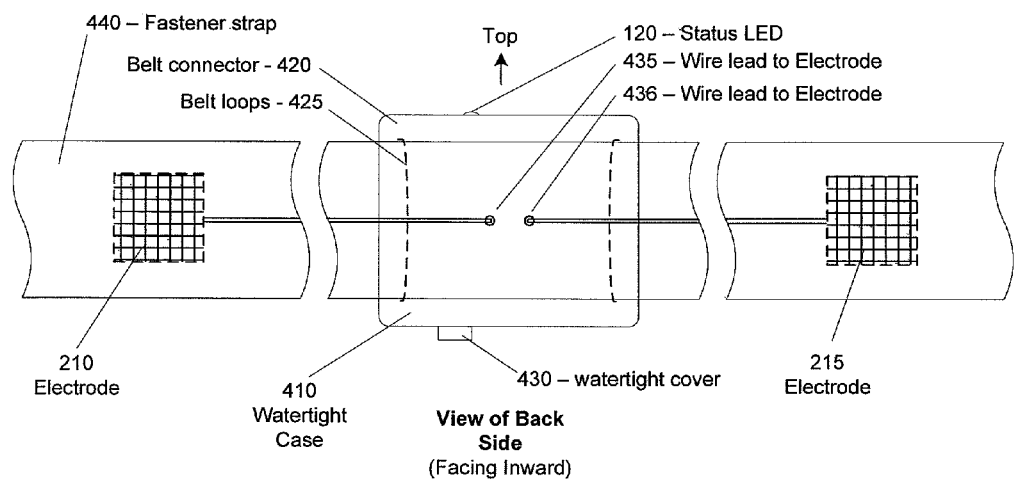
FIG. 9f shows the back-side view of the watertight case depicted in FIG. 9a, shown attached to a fastener strap with wire leads connecting the watertight case to electrodes embedded in the fastener strap.

FIG. 9*f* shows a back-side view of the device case attached to a fastener strap 440 in which the device electrodes 210 and 215 are embedded. Wire leads 435 and 436 connect for the electrodes 210 and 215 to external contacts to the control unit circuitry formed on the back side of the case. The dimensions of the belt connector 420 and the belt loops 425 may be made larger or smaller to accommodate fastener straps of different dimensions to attach to different parts of a user's body. The case may be constructed of metal, plastic, or some other suitable material to ensure structural rigidity, water integrity, and electrical compatibility. In a preferred embodiment, the case is formed of high density plastic by injection-molding and its contents are sealed from water intrusion by filling with waterproof epoxy on its back side.

FIG. 10*a* illustrates a top view of a strap-and-case combination 438 for the electronic shark deterrence device. The device electrodes 210 and 215 are positioned in an outer strap layer 490 at diametrically-opposite ends of the fastener strap 440, such that they are separated by the maximum distance equal to the diameter of the strap band when worn. In other embodiments, the electrodes may be positioned at other places on the fastener strap 440. An inner strap layer 492 is looped through the belt loops of the belt connector 420 and has an outer side of contact fastening material 445. The outer strap layer 490 overlies the inner strap layer 492 and is fastened to it by an inner side of complementary contact fastening material 445.

FIG. 10*b* shows an exploded view of a preferred embodiment of the contact-fastening material 445 comprised of an outer contact-fastening surface 475 of Velcro™ hook fabric and an inner contact-fastening surface 485 of Velcro™ loop fabric. In other embodiments, the layers of the fastener strap 440 may be attached together using other means known by those skilled in the art, including the use of a Safety Lock clasp.

FIG. 10*c* shows an exploded view of a preferred embodiment of the embedded electrode 210/215 which is sandwiched between a protective probe screen 470 made of insulative material facing outwards (towards the water) and the main strap layer 475.

Figure 10D:
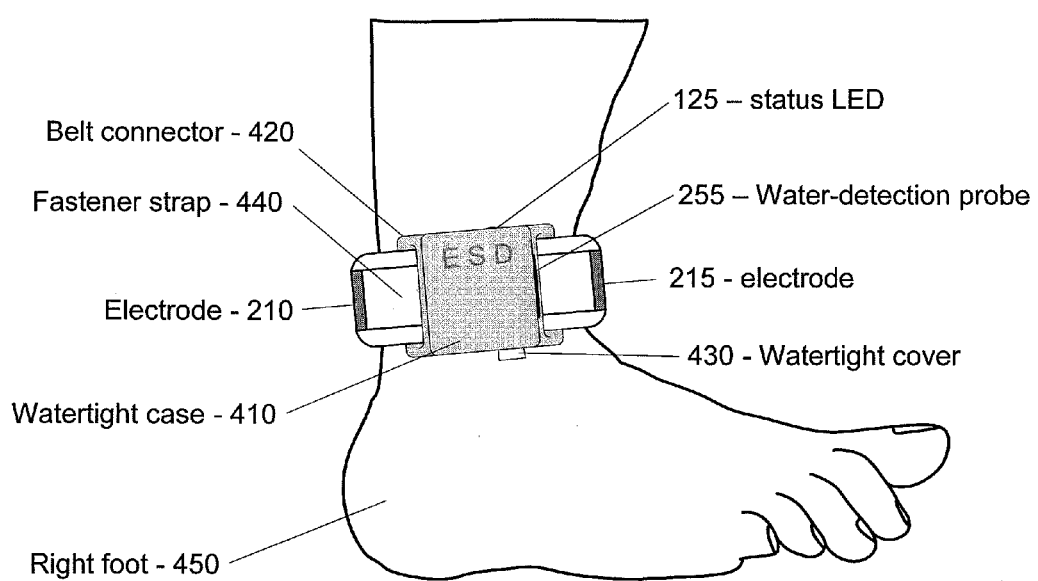
FIG. 10d illustrates an electronic shark deterrent device attached to a user's ankle with the fastener strap.

FIG. 10*d* illustrates one method for affixing the device case 410 to the user's ankle by attaching the strap-and-case combination around the user's right foot 450 by attaching the ends of the fastener strap 440 together. In other embodiments, the strap-and-case combination may be affixed to user's other ankle, to other parts of the user's body, or to other fixed or movable objects. FIG. 10*d* depicts the positioning of the status LED 125 facing upward towards the user's head, such that the user can easily monitor the device without manipulation. The electrodes 210 and 215 are shows at diametrically-opposite ends of the fastener strap 440 when installed on the body, such that their distance apart is maximized.

FIG. 11 shows a composite-view of a preferred embodiment of the fastener strap 440 comprised of an outer contact-fastening surface 465 on one attachment end of the strap, an outer probe insulator layer 460 on the other attachment end of the strap having a pair of probe windows 455*a/b* through which electrodes 210/215 buffered by a layer of insulative probe screens 470 are arranged, and a main strap layer 475 spanning both ends of the outer strap layer. Electrodes 210 and 215 are connected by wire leads 435 and 436 to the electronic control unit in the device case 410. On the inner side of the main strap layer 475 is an electrical insulator layer 480, an inner contact-fastening surface layer 485, and a skin-contact insulator layer 495. These components, along with other possible components, may be sewn, fused, or otherwise attached together, in the order shown, using techniques known by those skilled in the relevant art. The device case 410 is positioned at a fixed location on fastener strap 440 between the outer contact-fastening surface 465 and the outer probe insulator 460 by sliding the outer layers 490 of the fastener strap 440 through the belt loops 425 of the belt connector 420.

In a preferred embodiment of the fastener strap 440 used for attachment to the user's ankle, the probe windows 455, probe screens 470, and electrodes 210 and 215 are separated by a distance of about 111.1 mm (4.375 in.) along the length of the fastener strap 440, such that the electrodes are approximately positioned directly across from each other on the strap-and-case combination 438 when attached to the user's ankle. In other embodiments of the fastener strap 440, the probe windows 455, probe screens 470, and electrodes may be separated by a greater or lesser distance along the length of the fastener strap 440. The fastener strap 440 may be formed from a synthetic fabric. The outer probe insulator layer 460 and probe screens 470 may be formed of a dielectric material such as an insulative foam material. The electrodes 210 and 215 may be fabricated from woven steel mesh. The electrical insulator layer 480 may be fabricated from rubber. The skin-contact insulator layer 495 may be fabricated from synthetic fabric or foam material. In other embodiments, the fastener strap may be attached to other parts of the user's body, including the user's waist, thighs and upper-arms, or to other fixed or movable objects.

In addition to the embodiments and applications described herein, the present invention may be modified and applied to a variety of different scenarios and purposes, including the attachment to or placement in other objects and areas, such as swimming areas, fish ponds, watercraft, longlines, trawls, gillnets and the like, to prevent or minimize harmful interactions with sharks and other aquatic creatures.

The above description of certain preferred embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A device operable as an electronic shark deterrent comprising a high-voltage pulse signal waveform generator for generating an output pulse waveform to be applied to spaced-apart electrodes immersed in water to deter sharks and other aquatic creatures, wherein the output waveform comprises a train of pulse bursts, and each pulse burst is comprised of alternating-polarity pulses in a series, wherein said alternating-polarity pulses have irregular voltage amplitudes.

2. The device of claim 1, wherein said alternating-polarity pulses have a pulse width less than about 100 μs, preferably about 10 μs.

3. The device of claim 1, wherein said alternating-polarity pulses are separated by irregular timing intervals between pulses.

4. The device of claim 3, wherein the said irregular timing intervals are varied from about 10 to 500 ms, preferably from about 50 to 200 ms.

5. The device of claim 1, wherein said irregular voltage amplitudes are varied from about 50 to 400 V, preferably from about 150 to 200 V.

6. A device operable as an electronic shark deterrent comprising a high-voltage pulse signal waveform generator for generating an output pulse waveform to be applied to spaced-apart electrodes immersed in water to deter sharks and other aquatic creatures, wherein the output waveform comprises a train of pulse bursts, and each pulse burst is comprised of alternating-polarity pulses in a series, wherein said output pulse waveform comprises a train of pulse bursts which are separated by a delay interval between bursts of less than about 5 seconds, preferably about 2.5 seconds.

7. The device of claim 6, wherein said pulse bursts have a duration from about 1 to 6 seconds, preferably about 2.5 seconds.

8. A device for electronic shark deterrence adapted to be worn on a part of a user's body comprising a signal waveform generator enclosed in a thin, planar case mounted to a belt connector, and a fastener strap looped through said belt connector for attachment of the device to a part of a user's body or other object to be immersed in water to deter sharks and other aquatic creatures, wherein said signal waveform generator comprises a device circuit board formed in a plane with its front side carrying output contacts for external leads to output electrodes, a battery assembly including a flat rechargeable battery integrated within a planar battery housing, wherein the planar circuit board is fitted on top of the planar battery assembly in order to occupy a minimum device depth.

9. The device of claim 8, wherein said signal waveform generator includes a high-voltage capacitor as a comparatively large circuit component which is positioned on one lateral side and in parallel lengthwise with the circuit board and battery assembly so as not to add to the minimum device depth.

10. The device of claim 8, wherein said case contains a water-detection probe for enabling automatic activation of said signal waveform generator only when the device is immersed in water.

11. The device of claim 8, wherein said case contains a status LED indicator positioned on a top side thereof such that a user can monitor the status of said signal waveform generator circuitry of the device by looking at the status LED indicator from a distance.

12. The device of claim 8, wherein said fastener strap contains a pair of electrodes embedded in a layer of said fastener strap.

13. The device of claim 12, wherein said pair of embedded electrodes are positioned at diametrically-opposite ends of said fastener strap when it is fastened on a part of a user's body so as to maximize distance between the electrodes.

14. The device of claim 12, wherein said pair of embedded electrodes have outer surfaces which are buffered by a probe screen layer made of insulative material so as to minimize a tendency for electrostatic shock or tingling to the user's body.

15. The device of claim 12, wherein said pair of embedded electrodes are sandwiched between an outer probe insulator layer and a main strap layer for said fastener strap, and said outer probe insulator layer has windows through which the electrodes are projected.

16. The device of claim 8, wherein said case contains a port for recharging a rechargeable battery provided with said signal waveform generator circuitry, and said port has internal threading for receiving an external screw cap to cover it in a watertight manner when not in use.

17. The device of claim 8, wherein said device case is mounted to an outer layer of said fastener strap, and an inner layer of said fastener strap is interposed on an inner side of the device case for insulating it from making electrical contact with a part of a user's body.

\* \* \* \* \*